(12) United States Patent
Zhang et al.

(10) Patent No.: US 9,503,356 B2
(45) Date of Patent: Nov. 22, 2016

(54) METHOD AND DEVICE FOR DETERMINING TOPOLOGY OF NETWORK

(71) Applicant: ZTE Corporation, Shenzhen, Guangdong (CN)

(72) Inventors: Lei Zhang, Shenzhen (CN); Rui Guo, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/435,151

(22) PCT Filed: Jul. 29, 2013

(86) PCT No.: PCT/CN2013/080339
§ 371 (c)(1),
(2) Date: Apr. 10, 2015

(87) PCT Pub. No.: WO2013/170838
PCT Pub. Date: Nov. 21, 2013

(65) Prior Publication Data
US 2015/0271050 A1 Sep. 24, 2015

(30) Foreign Application Priority Data

Oct. 15, 2012 (CN) .......................... 2012 1 0390870

(51) Int. Cl.
*G01R 31/08* (2006.01)
*H04L 12/751* (2013.01)
(Continued)

(52) U.S. Cl.
CPC .............. *H04L 45/02* (2013.01); *H04L 41/12* (2013.01); *H04L 45/28* (2013.01)

(58) Field of Classification Search
USPC ............ 370/235, 252, 253, 280, 310.2, 349, 370/395.43, 395.6; 709/231, 232
See application file for complete search history.

(56) References Cited

U.S. PATENT DOCUMENTS 6,377,542 B1 * 4/2002 Asprey .................. H04J 3/1611
370/222
6,795,399 B1 * 9/2004 Benmohamed ......... H04L 47/10
370/235
(Continued)

FOREIGN PATENT DOCUMENTS

CN 1645863 A 7/2005
CN 1688133 A 10/2005
(Continued)

OTHER PUBLICATIONS

Zhanqi et al, Resource Utilization optimization method for transfer network, English Machine Translation, CN 1688133 (A), Oct. 26, 2005, pp. 1-28.*

(Continued)

*Primary Examiner* — Phuongchau Ba Nguyen
(74) *Attorney, Agent, or Firm* — Oppedahl Patent Law Firm LLC

(57) ABSTRACT

Provided is a method for determining topology of a network, including: all links of the network are divided into link sets $L(V1), \ldots, L(Vn)$ according to rate levels $V1, \ldots, Vn$ of links of the network, wherein n is a positive integer equal to or larger than 1; a link set $L(Vx)$ is divided into link subsets $L(Vx)1, \ldots, L(Vx)k$ according to connectivities of the links, wherein $1 \leq x \leq n$ and k is a positive integer equal to or larger than 1; and a network layer to which a link subset $L(Vx)y$ is attributed is determined, wherein $1 \leq y \leq k$. The disclosure solves the problem that it is difficult to divide artificially all links (and then nodes of respective links) to various network layers of respective layered networks when the networks have relatively large scale, it enables automatic calculation of a network layer to which a node is attributed, then enables automatic calculation of a networking structure of each layer of network and a number of nodes therein, thereby providing (Continued)

basic data to subsequent topology optimization of the network.

15 Claims, 10 Drawing Sheets

(51) Int. Cl.
*H04L 12/24* (2006.01)
*H04L 12/703* (2013.01)

(56) References Cited

U.S. PATENT DOCUMENTS

| | | | | |
|---|---|---|---|---|
| 8,707,137 | B2* | 4/2014 | Arye | H03M 13/356 |
| | | | | 714/704 |
| 2004/0213395 | A1* | 10/2004 | Ishii | H04L 41/0896 |
| | | | | 379/201.01 |
| 2006/0088059 | A1* | 4/2006 | Lim | H04L 47/2441 |
| | | | | 370/469 |
| 2007/0150565 | A1* | 6/2007 | Ayyagari | H04L 67/12 |
| | | | | 709/223 |
| 2008/0170854 | A1* | 7/2008 | Li | H04L 45/02 |
| | | | | 398/45 |
| 2009/0010164 | A1 | 1/2009 | Wang | |
| 2009/0109868 | A1* | 4/2009 | Chen | H04W 16/12 |
| | | | | 370/254 |
| 2011/0038265 | A1* | 2/2011 | Tao | H04W 52/0225 |
| | | | | 370/241 |
| 2011/0085445 | A1* | 4/2011 | Klincewicz | H04L 41/145 |
| | | | | 370/238 |
| 2011/0188409 | A1 | 8/2011 | Chen | |

FOREIGN PATENT DOCUMENTS

| | | | |
|---|---|---|---|
| CN | 101237395 A | 8/2008 | |
| EP | 001551117 A1 * | 7/2005 | H04L 29/04 |
| KR | 20050057391 A | 6/2005 | |

OTHER PUBLICATIONS

Supplementary European Search Report in European application No. 13790731.7, mailed on Sep. 30, 2015.
Community detection in graphs, Jun. 2009.
International Search Report in international application No. PCT/CN2013/080339, mailed on Nov. 7, 2013.
English Translation of the Written Opinion of the International Search Authority in international application No. PCT/CN2013/080339, mailed on Nov. 7, 2013.

* cited by examiner

METHOD AND DEVICE FOR DETERMINING TOPOLOGY OF NETWORK

TECHNICAL FIELD

The disclosure relates to the field of communications, and in particular to a method and device for determining topology of a network.

BACKGROUND

Packet Transport Network (PTN) techniques are connectivity-oriented network techniques with core spirits being packet-oriented general switching techniques. PTN techniques have something in common with traditional Synchronous Digital Hierarchy/Multi-service Transfer Platform (SDH/MSTP) in physical architecture in an aspect of networking, i.e., both have three network layers including a core layer, a convergence layer and an access layer, and ring networks, chain networks, mesh networks and the like can be networked.

Depending on scales of networks, for a network having relatively small quantity of nodes and relatively low traffic, its access layer can be networked as a ring using a Gigabit Ethernet (GE), its convergence layer can be networked as a ring using a 10 Gigabit Ethernet (10GE), and its core layer can also be networked as a ring using a 10GE due to its relatively low traffic. Some networks have only two layers, i.e., an access layer and a core convergence layer; for a network having relatively large quantity of nodes and relatively high traffic, its access layer can be networked as a ring using a GE, its convergence layer can be networked as a ring using a 10GE, but it has relatively high traffic and its 10GE ring of the convergence layer is nearly full, thus if the core layer is also networked as a ring using a 10GE, then the bandwidth can not be converged, and in this case, it can be constructed in a direct way, such as being networked as a mesh network architecture.

The core layer takes responsible for providing interstation circuits between core nodes and scheduling various services, thus the core layer should have high volume service scheduling capability and multi-service transmission capability. The core layer can be networked as a ring using a 10GE with a number of nodes being 2 to 6; and it can also be networked as a mesh network.

The convergence layer takes responsible for converging and grooming various services within a certain area, thus the convergence layer should have relatively high service convergence capability and multi-service transmission capability, and it can be networked as a ring using a 10GE with a number of nodes preferably being 4 to 8.

The access layer should have flexible and fast multi-service access capability. It can be networked as a ring or chain, with a number of nodes on the ring being no more than 15 and a number of nodes on the chain being no more than 3.

When networks are planed and constructed, above networking rules can be substantially complied with, but during development and evolution of these networks, there tends to be excessive nodes on a ring (or chain) due to various reasons, thus network structure optimization is an important part of PTN optimization. When networks have relatively large scale, it is difficult to divide artificially all links (and then nodes of respective links) to various network layers of respective layered networks, this makes it difficult to calculate the networking type of each layered network and to count the number of nodes on each ring (or chain) of the whole network, thus bringing too much difficulty to the network optimization.

In fact, besides PTN networks, other types of networks also encounter the same problem that it is difficult to divide artificially all links (and then nodes of respective links) to various network layers of respective layered networks when the networks have relatively large scale. However, as to the problem in relevant techniques that it is difficult to divide artificially all links (and then nodes of respective links) to various network layers of respective layered networks when the networks have relatively large scale, there is no effective solution proposed so far.

SUMMARY

As to the problem in relevant techniques that it is difficult to divide artificially all links (and then nodes of respective links) to various network layers of respective layered networks when the networks have relatively large scale, the embodiment of the disclosure provides a method and device for determining topology of a network so as to solve at least the above problem.

According to one aspect of the disclosure, provided is a method for determining topology of a network, including: all links of the network are divided into link sets $L(V1), \ldots, L(Vn)$ according to rate levels $V1, \ldots, Vn$ of links of the network, wherein n is a positive integer equal to or larger than 1; a link set $L(Vx)$ is divided into link subsets $L(Vx)1, \ldots, L(Vx)k$ according to connectivities of the links, wherein $1 \le x \le n$ and k is a positive integer equal to or larger than 1; and a network layer to which a link subset $L(Vx)y$ is attributed is determined, wherein $1 \le y \le k$.

In an embodiment, after the dividing, according to connectivities of the links, a link set $L(Vx)$ into link subsets $L(Vx)1, \ldots, L(Vx)k$, the method may further include: a type of a networked network to which the link subset $L(Vx)y$ is attributed is determined.

In an embodiment, when a networked network corresponding to the link subset $L(Vx)y$ includes P nodes, and a number of nodes connected with a node is designated as a degree d of the node, then the determining a type of a networked network to which the link subset $L(Vx)y$ is attributed may include: when $P \ge 2$, two nodes in the networked network have their degrees $d=1$ and other nodes have their degrees $d=2$, then the type of the networked network to which the link subset $L(Vx)y$ is attributed is a chain network; when $P \ge 3$ and each node in the networked network has its degree $d=2$, then the type of the networked network to which the link subset $L(Vx)y$ is attributed is a ring network; when $P \ge 4$, N nodes in the networked network have their degrees $d=1$, one node has its degree $d=N$ and other nodes have their degrees $d=2$, then the type of the networked network to which the link subset $L(Vx)y$ is attributed is a star network; when $P \ge 5$, one node in the networked network has its degree $d=4$ and other nodes have their degrees $d=2$, then the type of the networked network to which the link subset $L(Vx)y$ is attributed is a tangent ring network; when $P \ge 6$, two nodes in the networked network have their degrees $d=3$ and other nodes have their degrees $d=2$, then the type of the networked network to which the link subset $L(Vx)y$ is attributed is an intersecting ring network; when $P \ge 4$ and each node in the networked network has its degree $d \ge 3$, then the type of the networked network to which the link subset $L(Vx)y$ is attributed is a mesh network.

In an embodiment, after the step that a type of a networked network to which the link subset L(Vx)y is attributed is determined, the method may further include: the type of the networked network to which the link subset L(Vx)y is attributed is re-determined according to a relation between the networked network corresponding to the link subset L(Vx)y and networked networks corresponding to other link subsets.

In an embodiment, the step that the type of the networked network to which the link subset L(Vx)y is attributed is re-determined according to a relation between the networked network corresponding to the link subset L(Vx)y and networked networks corresponding to other link subsets may include: in the case that the type of the networked network to which the link subset L(Vx)y is attributed is a chain network, when two end nodes of the networked network corresponding to the link subset L(Vx)y are two nodes in an upper-layer networked network, then the type of the networked network to which the link subset L(Vx)y is attributed is adjusted to a ring network, and nodes and links between the two nodes in the upper-layer networked network are added to the networked network corresponding to the link subset L(Vx)y; in the case that the type of the networked network to which the link subset L(Vx)y is attributed is a star network, when two end nodes of the networked network corresponding to the link subset L(Vx)y are two nodes in an upper-layer networked network, then two branches of the star network in the networked network to which the link subset L(Vx)y is attributed are adjusted to a ring network, and nodes and links between the two nodes in the upper-layer networked network are added to the networked network corresponding to the link subset L(Vx)y.

In an embodiment, after the step that a network layer to which a link subset L(Vx)y is attributed is determined and the step that a type of a networked network to which the link subset L(Vx)y is attributed is determined or the type of the networked network to which the link subset L(Vx)y is attributed is re-determined, the method may further include: a ring forming ratio of each network layer of the network is calculated, wherein the ring forming ratio of each network layer is a ratio between a number of nodes forming a ring in each network layer and a number of all nodes in said each network layer, the nodes forming a ring are nodes on a predetermined type of networked network, and the predetermined type of networked network comprises one of: a mesh network, a ring network, an intersecting ring network or a tangent ring network.

In an embodiment, before the step that a network layer to which a link subset L(Vx)y is attributed is determined, the method may further include: network layers to which nodes and/or links in the network are attributed are labeled according to network feature information, wherein the network feature information is used to characterize relations between the nodes and/or links and the network layers.

In an embodiment, the network feature information may include at least one of: a correspondence between the type of a node and a network layer to which the node is attributed, a correspondence between the device model of the node and the network layer to which the node is attributed, or a correspondence between the rate of a link and a network layer to which the link and/or a node connected to the link is attributed.

In an embodiment, the step that a network layer to which a link subset L(Vx)y is attributed is determined may include: the network layer to which the link subset L(Vx)y is attributed is determined according to predetermined information, wherein the predetermined information includes at least one of: proximity relations between a networked network corresponding to the link subset L(Vx)y and networked network corresponding to other link subsets, network feature information for characterizing relations between nodes and/or links and network layers, or labeling information of network layers to which the nodes and/or links are attributed.

In an embodiment, the determining a network layer to which the link subset L(Vx)y is attributed may include: in the case that the link subset L(Vx)y meets a first condition, it is determined that the network layer to which the link subset L(Vx)y is attributed is an access layer; wherein the first condition includes at least one of:

there is a link of the access layer in a first networked network corresponding to the link subset L(Vx)y; or there is a node of the access layer in the first networked network corresponding to the link subset L(Vx)y and all of links connected with the node have a same rate.

In an embodiment, the determining a network layer to which the link subset L(Vx)y is attributed may include:

in the case that the link subset L(Vx)y meets a second condition, it is determined that the network layer to which the link subset L(Vx)y is attributed is an convergence layer; wherein the second condition includes at least one of: the first networked network corresponding to the link subset L(Vx)y is connected with a second networked network of the access layer, and the second networked network has a rate level higher than a rate level of the first networked network; the first networked network corresponding to the link subset L(Vx)y is connected with multiple networked networks, a second networked network of a core layer and a third networked network of the access network exist simultaneously in the multiple networked networks, the rate level of the first networked network is larger than a rate level of the third networked network of the access layer and is smaller than or equal to a rate level of the second networked network of the core layer;

the first networked network corresponding to the link subset L(Vx)y is adjacent to the second networked network, the first networked network is connected with the third networked network of the access layer, the second networked network is connected with a fourth networked network of the access layer, and the rate level of the first networked network is larger than the rate level of the third networked network and the rate level of the second networked network is larger than a rate level of the fourth networked network; or the first networked network corresponding to the link subset L(Vx)y is adjacent to the second networked network, the first networked network is connected with the third networked network of the access layer, the second networked network is not connected with networked networks of any access layer, the rate level of the second networked network is larger than or equal to the rate level of the first networked network, and the rate level of the first networked network is larger than the rate level of the third networked network.

In an embodiment, the determining a network layer to which the link subset L(Vx)y is attributed may include: in the case that the link subset L(Vx)y meets a third condition, it is determined that the network layer to which the link subset L(Vx)y is attributed is an core layer; wherein the third condition includes: the first networked network corresponding to the link subset L(Vx)y is adjacent to the second networked network, the second networked network is connected with the third networked network of the access layer, the first networked network is not connected with networked networks of any access layer, the rate level of the first networked network is larger than or equal to the rate level of the second networked network, and the rate level of the second networked network is larger than the rate level of the third networked network.

In an embodiment, the determining a network layer to which the link subset L(Vx)y is attributed may include:

in the case that the link subset L(Vx)y meets a fourth condition, it is determined that the network layer to which the link subset L(Vx)y is attributed is an core convergence layer; wherein the fourth condition includes at least one of: the first networked network corresponding to the link subset L(Vx)y is connected with a second networked network of the access layer, and the second networked network has a rate level higher than a rate level of the first networked network; the first networked network corresponding to the link subset L(Vx)y is connected with multiple networked networks, a second networked network of a core layer and a third networked network of the access network exist simultaneously in the multiple networked networks, the rate level of the first networked network is larger than a rate level of the third networked network of the access layer and is smaller than or equal to a rate level of the second networked network of the core layer; the first networked network corresponding to the link subset L(Vx)y is adjacent to the second networked network, the first networked network is connected with the third networked network of the access layer, the second networked network is connected with a fourth networked network of the access layer, and the rate level of the first networked network is larger than the rate level of the third networked network and the rate level of the second networked network is larger than a rate level of the fourth networked network;

the first networked network corresponding to the link subset L(Vx)y is adjacent to the second networked network, the first networked network is connected with the third networked network of the access layer, the second networked network is not connected with networked networks of any access layer, the rate level of the second networked network is larger than or equal to the rate level of the first networked network, and the rate level of the first networked network is larger than the rate level of the third networked network; or the first networked network corresponding to the link subset L(Vx)y is adjacent to the second networked network, the second networked network is connected with the third networked network of the access layer, the first networked network is not connected with networked networks of any access layer, the rate level of the first networked network is larger than or equal to the rate level of the second networked network, and the rate level of the second networked network is larger than the rate level of the third networked network.

In an embodiment, the step that the link set L(Vx) is divided into link subsets L(Vx)1 . . . L(Vx)k according to connectivities may include: the link set L(Vx) is divided into the link subsets L(Vx)1 . . . L(Vx)k based on a division rule with respect to connectivities, wherein the division rule with respect to connectivities includes: respective nodes in each divided link subset can be connected with each other via links of the link subset and none of the nodes in the link subset has a link with other link subset.

In an embodiment, during the dividing the link set L(Vx) according to connectivity into link subsets L(Vx)1 . . . L(Vx)k, when one node corresponds simultaneously to a first rate level and a second rate level, then the link set L(Vx) is divided into two link subsets by taking the node as a boundary.

In an embodiment, the method may further include: topology information is output, wherein the topology information includes at least one of: network layers to which respective link subsets L(Vx)y are attributed, nodes included in respective link subsets L(Vx)y, a number of the nodes included in respective link subsets L(Vx)y, links included in respective link subsets L(Vx)y, types of networked networks to which respective link subsets L(Vx)y are attributed, rate levels corresponding to respective link subsets L(Vx)y, ring forming ratios of respective network layers of the network, nodes having no links connected therewith in the network, or a number of the nodes having no links connected therewith in the network.

According to another aspect of the disclosure, provided is a device for determining topology of a network, including: a first division module configured to divide all links of the network into link sets L(V1), . . . , L(Vn) according to rate levels V1, . . . , Vn of the links of the network, wherein n is a positive integer equal to or larger than 1; a second division module configured to divide a link set L(Vx) into link subsets L(Vx)1, . . . , L(Vx)k according to connectivities of the links, wherein $1 \leq x \leq n$ and k is a positive integer equal to or larger than 1; and a network layer determination module configured to determine a network layer to which a link subset L(Vx)y is attributed, wherein $1 \leq y \leq k$.

In an embodiment, the device may further include a networked network type determination module configured to determine a type of a networked network to which the link subset L(Vx)y is attributed.

In an embodiment, the device may further include a networked network re-determination module configured to re-determine, according to a relation between the networked network corresponding to the link subset L(Vx)y and networked networks corresponding to other link subsets, the type of the networked network to which the link subset L(Vx)y is attributed.

In an embodiment, the device may further include a ring forming ratio calculation module configured to calculate a ring forming ratio of each network layer of the network, wherein the ring forming ratio of each network layer is a ratio between a number of nodes forming a ring in each network layer and a number of all nodes in said each network layer, the nodes forming a ring are nodes on a predetermined type of networked network, and the predetermined type of networked network comprises one of: a mesh network, a ring network, an intersecting ring network or a tangent ring network.

By means of the disclosure, all links are divided into link sets according to rates, then the link sets are divided into link subsets according to connectivities, thus respective links are divided automatically into different sets/subsets, which facilitates attribution of respective links to different network layers; the disclosure solves the problem that it is difficult to divide artificially all links (and then nodes of respective links) to various network layers of respective layered networks when the networks have relatively large scale, it enables automatic calculation of a network layer to which a node is attributed, then enables automatic calculation of a networking structure of each layer of network and a number of nodes therein, and further enables automatic determination of topology of a current network, thereby providing basic data to subsequent topology optimization of the network.

BRIEF DESCRIPTION OF THE DRAWINGS

The accompanying drawings illustrated herein are used to provide further understanding of the disclosure and constitute a part of the disclosure, and illustrative embodiments of the disclosure and their description are used to explain the disclosure instead of constituting improper limitation to the disclosure. Wherein.

DETAILED DESCRIPTION

The disclosure will be elaborated below with reference to accompanying drawings in combination with embodiments. It should be noted that embodiments of the disclosure and features in the embodiments can be combined with each other in case of no conflicts.

Embodiment 1

Figure 1:
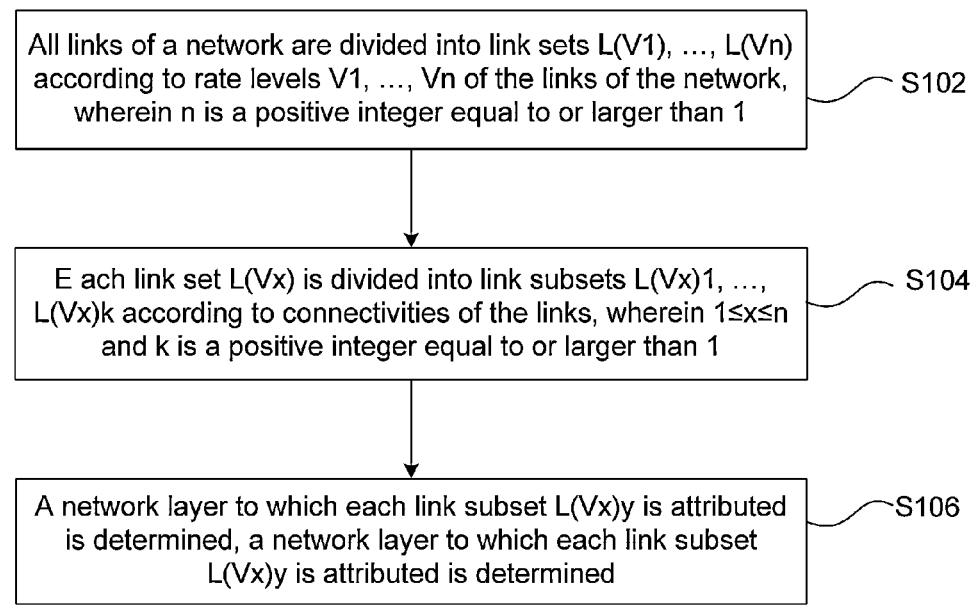
FIG. 1 is a flowchart of a method for determining topology of a network according to a first embodiment of the disclosure.

FIG. 1 is a flowchart of a method for determining topology of a network according to a first embodiment of the disclosure, as shown in FIG. 1, the method includes:

step S102, all links of a network are divided into link sets L(V1), . . . , L(Vn) according to rate levels V1, . . . , Vn of the links of the network, wherein n is a positive integer equal to or larger than 1;

step S104, each link set L(Vx) is divided into link subsets L(Vx)1, . . . , L(Vx)k according to connectivities of the links, wherein 1≤x≤n and k is a positive integer equal to or larger than 1; and step S106, a network layer to which each link subset L(Vx)y is attributed is determined, wherein 1≤y≤k.

As a preferred implementation, during the division of link subsets, the link set L(Vx) can be divided into the link subsets L(Vx)1 . . . L(Vx)k based on a division rule with respect to connectivities, wherein the division rule with respect to connectivities includes: respective nodes in each divided link subset can be connected with each other via links of the link subset and none of the nodes in the link subset has a link with other link subset.

In practical networking, during the dividing the link set L(Vx) according to connectivity into link subsets L(Vx)1 . . . L(Vx)k, when one node corresponds simultaneously to a first rate level and a second rate level, then the link set L(Vx) is divided into two link subsets by taking the node as a boundary.

In practical applications, the network layer can be determined in many ways depending on network conditions. A preferred implementation of determining the network layer in step S106 will be elaborated in a subsequent embodiment 7.

By means of the disclosure, all links are divided into link sets according to rates, then the link sets are divided into link subsets according to connectivities, thus respective links are divided automatically into different sets/subsets, which facilitates attribution of respective links to different network layers; the disclosure solves the problem that it is difficult to divide artificially all links (and then nodes of respective links) to various network layers of respective layered networks when the networks have relatively large scale, it enables automatic calculation of a network layer to which a node is attributed, thereby providing basic data to subsequent topology optimization of the network.

Embodiment 2

Figure 2:
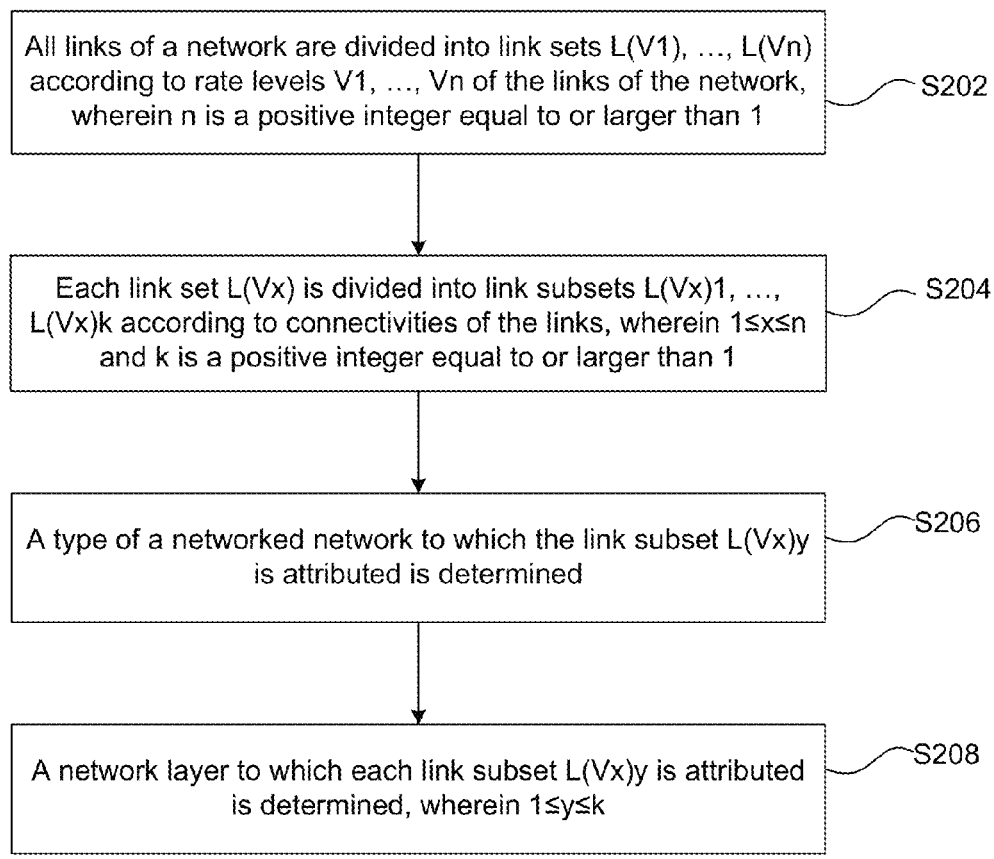
FIG. 2 is a flowchart of a method for determining topology of a network according to a second embodiment of the disclosure.

Besides acquisition of a network layer of a node, in order to further acquire more topology information, a type of a networked network to which each link subset is attributed can also be acquired, thus as a preferred implementation, the present embodiment adds a step of determining the type of the networked network to embodiment 1. FIG. 2 is a flowchart of a method for determining topology of a network according to embodiment 2 of the disclosure, as shown in FIG. 2, the method includes:

step S202, all links of a network are divided into link sets L(V1), . . . , L(Vn) according to rate levels V1, . . . , Vn of the links of the network, wherein n is a positive integer equal to or larger than 1;

step S204, each link set L(Vx) is divided into link subsets L(Vx)1, . . . , L(Vx)k according to connectivities of the links, wherein 1≤x≤n and k is a positive integer equal to or larger than 1;

step S206, a type of a networked network to which the link subset L(Vx)y is attributed is determined;

step S208, a network layer to which each link subset L(Vx)y is attributed is determined, wherein 1≤y≤k.

Specific ways for determining a type a networked network can be selected according to practical network application scenarios, a preferred implementation for determining a type of a networked network in step S206 will be elaborated in subsequent embodiment 6.

In practical applications, the network layer can be determined in many ways depending on network conditions. A preferred implementation of determining the network layer in step S208 will be elaborated in a subsequent embodiment 7.

It should be noted that though step S206 in the embodiment for determining a type of a networked network is performed before step S208, a relative order between these two steps can be designated arbitrarily and is not limited to what is described above. For example, the network layer can be determined firstly and then the type of a networked network can be determined, or in the case when there are multiple processors, it is also possible to determine in parallel the network layer and the type of a networked network, and there is no limitation placed in this regard.

By means of the method, based on the acquisition of the network layer, a type of a networked network for each network layer can also be acquired, which can be provided as basic data for subsequent topology optimization of the network.

Embodiment 3

Figure 3:
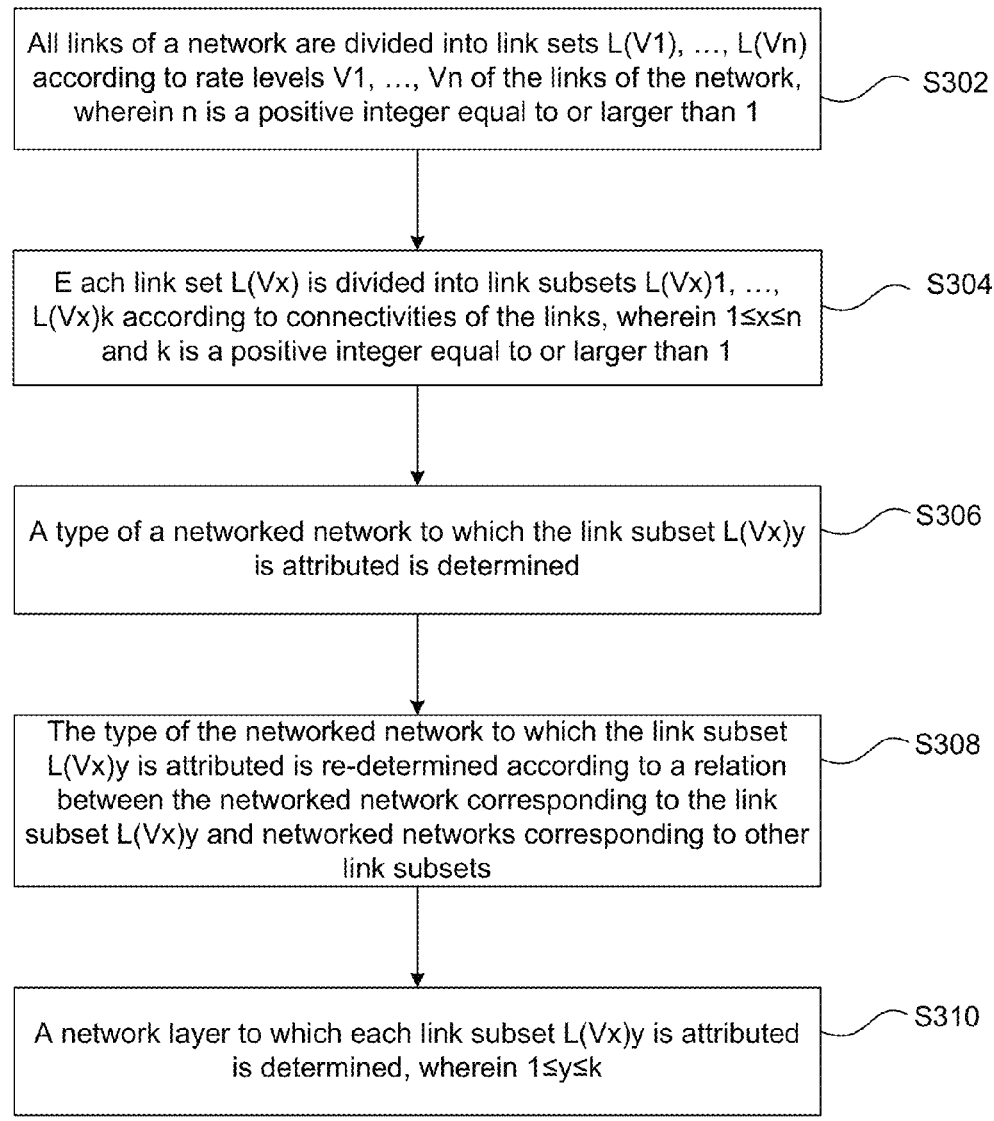
FIG. 3 is a flowchart of a method for determining topology of a network according to a third embodiment of the disclosure.

In a practical networked network, after the determination of a type of a networked network to which the link subset L(Vx)y is attributed, there may be cases that the type of a networked network needs to be re-determined. Thus, based on embodiment 2, the present embodiment provides a preferred implementation, which, after the determination of a type of a networked network to which the link subset L(Vx)y is attributed, includes a step of re-determining a type of a networked network. FIG. 3 is a flowchart of a method for determining topology of a network according to a first embodiment of the disclosure, as shown in FIG. 3, the method includes:

step S302, all links of a network are divided into link sets L(V1), ..., L(Vn) according to rate levels V1, ..., Vn of the links of the network, wherein n is a positive integer equal to or larger than 1;

step S304, each link set L(Vx) is divided into link subsets L(Vx)1, ..., L(Vx)k according to connectivities of the links, wherein 1≤x≤n and k is a positive integer equal to or larger than 1; and step S306, a type of a networked network to which the link subset L(Vx)y is attributed is determined;

step S308, the type of the networked network to which the link subset L(Vx)y is attributed is re-determined according to a relation between the networked network corresponding to the link subset L(Vx)y and networked networks corresponding to other link subsets;

step S310, a network layer to which each link subset L(Vx)y is attributed is determined, wherein 1≤y≤k.

Two cases in which the type of the networked network needs to be re-determined are enumerated below, and specific adjustment processes are given. It should be noted that depending on different network topology scenarios, there may be other cases in which a type of a networked network needs to be re-determined, relevant determination methods and processing processes can be set according to practical conditions, and they are not limited to the methods enumerated herein. In the preferred embodiment, step S308 includes:

in the case that the type of the networked network to which the link subset L(Vx)y is attributed is a chain network, when two end nodes of the networked network corresponding to the link subset L(Vx)y are two nodes in an upper-layer networked network, then adjusting the type of the networked network to which the link subset L(Vx)y is attributed to a ring network, and adding nodes and links between the two nodes in the upper-layer networked network to the networked network corresponding to the link subset L(Vx)y; or in the case that the type of the networked network to which the link subset L(Vx)y is attributed is a star network, when two end nodes of the networked network corresponding to the link subset L(Vx)y are two nodes in an upper-layer networked network, then adjusting two branches of the star network in the networked network to which the link subset L(Vx)y is attributed, to a ring network, and adding nodes and links between the two nodes in the upper-layer networked network to the networked network corresponding to the link subset L(Vx)y.

it should be noted that specific ways for determining a type a networked network can be selected according to practical network application scenarios, a preferred implementation for determining a type of a networked network in step S308 will be elaborated in subsequent embodiment 6.

In practical applications, the network layer can be determined in many ways depending on network conditions. A preferred embodiment of determining the network layer in step S310 will be elaborated in a subsequent embodiment 7.

It should be noted that step S308 for re-determining a type of a networked network should be performed after step S306 for determining the type of the networked network. But, It should be noted that though step S310 in the embodiment for determining a type of a networked network is performed after steps S306 and S308, a relative order between step S310 and the steps S306 and S308 can be designated arbitrarily and is not limited to what is described above. For example, the network layer can be determined firstly and then the type of a networked network can be determined, or in the case when there are multiple processors, it is also possible to determine in parallel the network layer and the type of a networked network, and there is no limitation placed in this regard.

By means of the method, based on the acquisition of the network layer, a type of a networked network for each network layer can also be acquired, which can be provided as basic data for subsequent topology optimization of the network.

By means of the solution provided by embodiments 2 and 3 for determining a type of a networked network, it is possible to automatically calculate a networking structure of each network layer, thus making it possible to count subsequently a number of nodes and/or links of each network layer, thereby providing subsequent structure optimization of the network with basic data.

Embodiment 4

Figure 4:
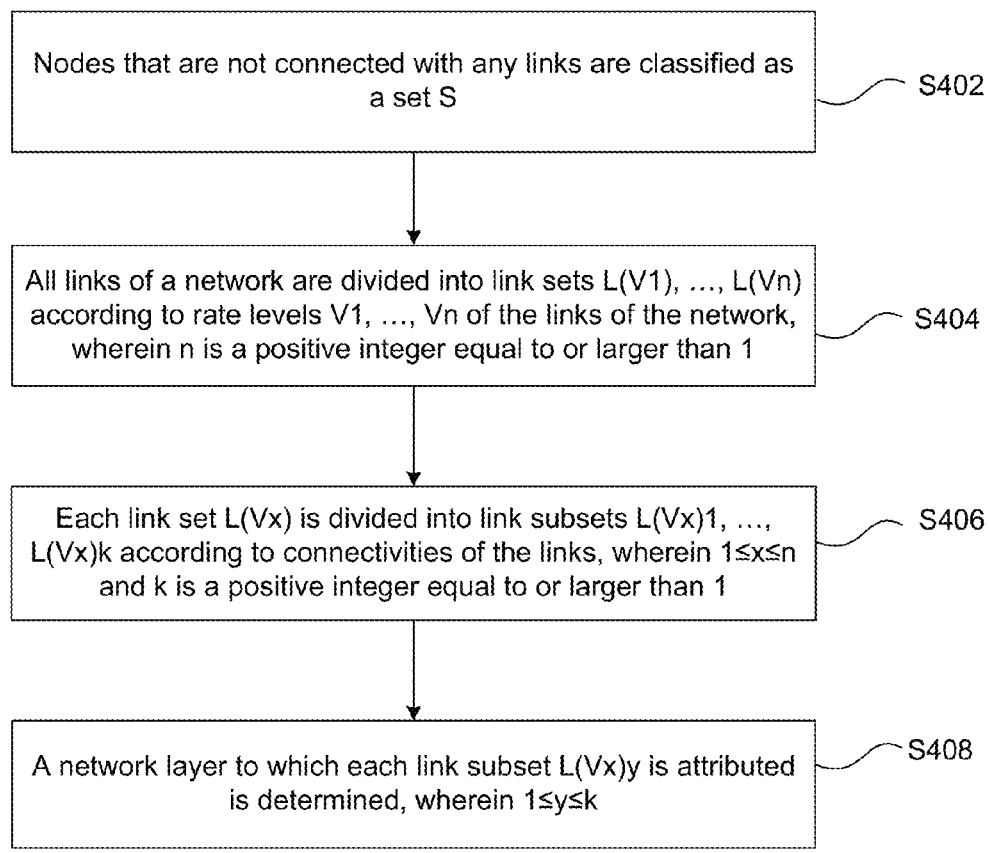
FIG. 4 is a flowchart of a method for determining topology of a network according to a fourth embodiment of the disclosure.

Given cases that there may be single points in a network, thus in order to more fully know topology of the whole network, the single points can be counted. The present embodiment adds a step for counting single points to embodiment 1. FIG. 4 is a flowchart of a method for determining topology of a network according to a first embodiment of the disclosure, as shown in FIG. 4, the method includes:

step S402, nodes that are not connected with any links are classified as a set S, preferably, a number of the nodes in the set S can be counted so as to provide subsequent output of network topology with basic data.

step S404, all links of a network are divided into link sets L(V1), . . . , L(Vn) according to rate levels V1, . . . , Vn of the links of the network, wherein n is a positive integer equal to or larger than 1;

step S406, each link set L(Vx) is divided into link subsets L(Vx)1, . . . , L(Vx)k according to connectivities of the links, wherein $1 \leq x \leq n$ and k is a positive integer equal to or larger than 1; and step S408, a network layer to which each link subset L(Vx)y is attributed is determined, wherein $1 \leq y \leq k$.

It should be noted that each node in the set S is a networked network, a type of the networked network is single-point network, which is not involved in a separate calculation of network layers.

It should be noted that in practical applications, the network layer can be determined in many ways depending on network conditions. A preferred embodiment of determining the network layer in step S408 will be elaborated in a subsequent embodiment 7.

The counting of single points and the determination of the network layer is independent, thus a relative order between step S402 for determining single points and other three steps can be designated arbitrarily and it is not limited to the order in the present embodiment that the single points are determined firstly and then the network layer is determined, it is possible to determine firstly the network layer and then determine the single points, both are performed in parallel.

In addition, the present embodiment adds a step for determining a single point to embodiment 1. However, those skilled in the art should appreciate that the step for determining a single point is independent from the steps for determining a network layer and for determining a type of a networked network, thus in order to more fully know topology of the whole network, the step for determining a single point can also be added to the steps for determining a network layer and for determining a type of a networked network, that is to say, the step for determining a single point can be added to embodiment 2 or 3, and the detailed description thereof will be omitted herein. In addition, a relative order between the step for determining a single point and the step for determining a type of a networked network is not fixed and can be designated arbitrarily.

Embodiment 5

Figure 5:
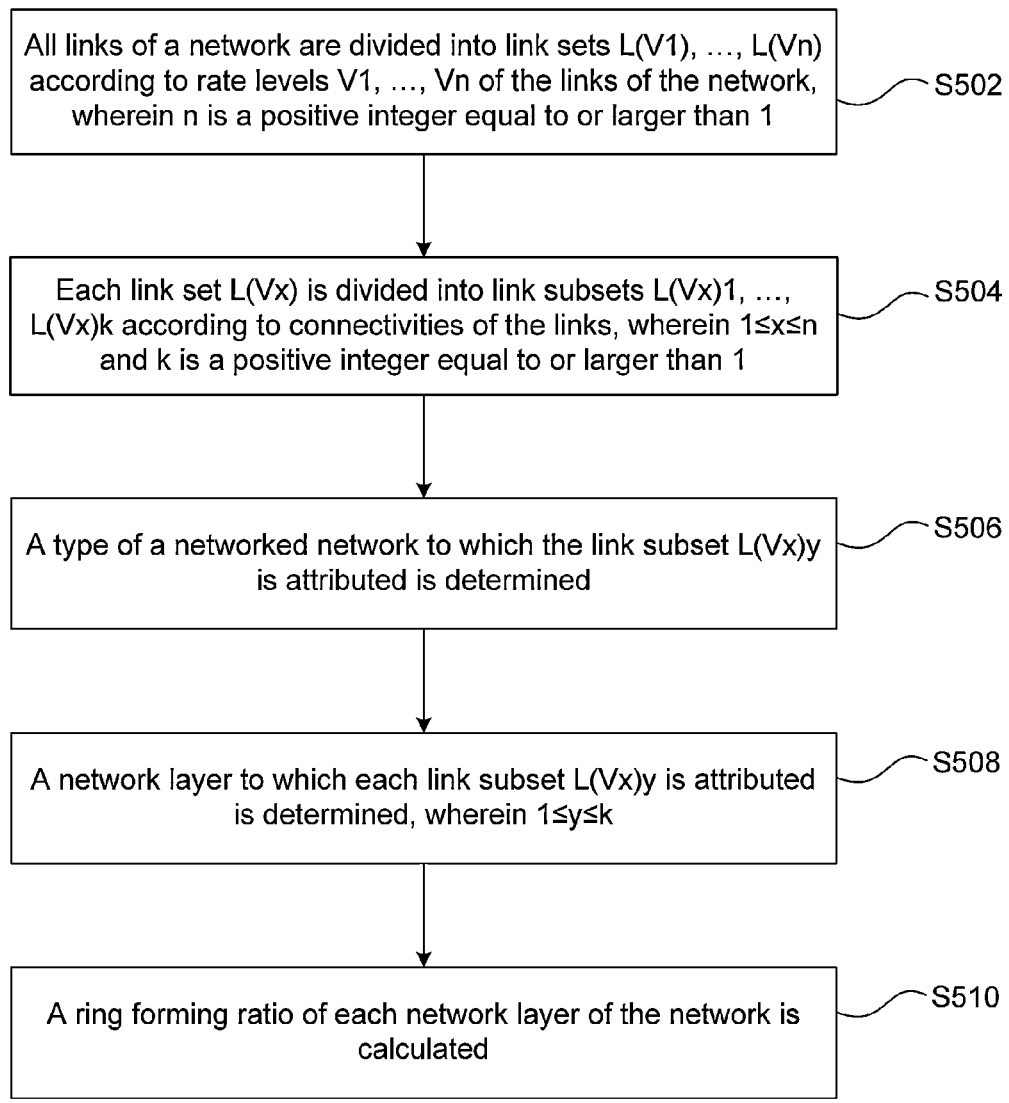
FIG. 5 is a flowchart of a method for determining topology of a network according to a fifth embodiment of the disclosure.

The present embodiment adds a step for calculating a ring forming ratio of each network layer to embodiment 2. FIG. 5 is a flowchart of a method for determining topology of a network according to a first embodiment of the disclosure, as shown in FIG. 5, the method includes:

step S502, all links of a network are divided into link sets L(V1), . . . , L(Vn) according to rate levels V1, . . . , Vn of the links of the network, wherein n is a positive integer equal to or larger than 1;

step S504, each link set L(Vx) is divided into link subsets L(Vx)1, . . . , L(Vx)k according to connectivities of the links, wherein $1 \leq x \leq n$ and k is a positive integer equal to or larger than 1; and step S506, a type of a networked network to which the link subset L(Vx)y is attributed is determined;

step S508, a network layer to which each link subset L(Vx)y is attributed is determined, wherein $1 \leq y \leq k$; and step S510, a ring forming ratio of each network layer of the network is calculated.

Specifically, the ring forming ratio is defined as below: when a node of the network belongs to one of any types of ring networks (ring, intersecting ring, tangent ring) or mesh networks, then the node is referred to as a ring forming node, otherwise the node is referred to as a non-ring forming node, thus a ratio between a number of ring forming nodes in a network layer and a number of nodes in the network layer is referred to as the ring forming ratio of the network layer.

In step S510, the ring forming ratio of a network layer can be calculated as below: after distinguishing types of networked networks on links of the whole network, re-determining the types of the networked networks (optional, not performed in cases when there are no types of networked networks to be re-determined) and calculating a network layer, it is determined whether each node in the network layer is one of a ring network, an intersecting ring network, a tangent ring network or a mesh network, if yes, the node is involved in the counting, and a ratio between a final counting result and the number of nodes in the network layer is namely the ring forming ratio of the network layer.

It should be noted that specific ways for determining a type a networked network can be selected according to practical network application scenarios, a preferred implementation for determining a type of a networked network in step S506 will be elaborated in subsequent embodiment 6.

In practical applications, the network layer can be determined in many ways depending on network conditions. A preferred embodiment of determining the network layer in step S508 will be elaborated in a subsequent embodiment 7.

It should be noted that for a method for determining topology of a network, which includes the step of calculating the ring forming ratio of each network layer, the present embodiment is described based on embodiment 2, but there is no limitation placed in this regard, for example, the ring forming ratio of each network layer can be calculated based on embodiment 3, in the case when a type of a networked network needs to be re-determined, the step for calculating the ring forming ratio of each layer can be performed after the step for re-determining a type of a networked network in embodiment 3, wherein the ring forming ratio can be calculated based on a re-determined type of the networked network.

In addition, step S510 for calculating a ring forming ratio of each network layer is performed after step S506 for determining a type of a networked network and step S508 for determining a network layer. It should be noted that though step S506 in the embodiment for determining a type of a networked network is performed before step S508, a relative order between these two steps can be designated arbitrarily and is not limited to what is described above. For example, the network layer can be determined firstly and then the type of a networked network can be determined, or in the case when there are multiple processors, it is also possible to determine in parallel the network layer and the type of a networked network, and there is no limitation placed in this regard.

Embodiment 6

The specific ways for determining a type of networked network involved in above embodiments can be selected according to practical network application scenarios, the present embodiment only enumerates one way for determining a type of networked network, other ways for determining a type of networked network can also be used in practical applications rather than being limited to the way provided by the present embodiment. In the preferred embodiment, when a networked network corresponding to the link subset L(Vx)y includes P nodes, and a number of nodes connected with a node is designated as a degree d of the node, then the step that a type of a networked network to which the link subset L(Vx)y is attributed is determined includes:

(1) when P≥2, two nodes in the networked network have their degrees d=1 and other nodes have their degrees d=2, then the type of the networked network to which the link subset L(Vx)y is attributed is a chain network;

(2) when P≥3 and each node in the networked network has its degree d=2, then the type of the networked network to which the link subset L(Vx)y is attributed is a ring network;

(3) when P≥4, N nodes in the networked network have their degrees d=1, one node has its degree d=N and other nodes have their degrees d=2, then the type of the networked network to which the link subset L(Vx)y is attributed is a star network;

(4) when P≥5, one node in the networked network has its degree d=4 and other nodes have their degrees d=2, then the type of the networked network to which the link subset L(Vx)y is attributed is a tangent ring network;

(5) when P≥6, two nodes in the networked network have their degrees d=3 and other nodes have their degrees d=2, then the type of the networked network to which the link subset L(Vx)y is attributed is an intersecting ring network;

(6) when P≥4 and each node in the networked network has its degree d≥3, then the type of the networked network to which the link subset L(Vx)y is attributed is a mesh network;

Embodiment 7

The embodiment described in detail several preferred ways for determining a network layer.

Given that in a practical network there may be a one-to-one correspondence (which can be inherent to the network or defined by a user) between a feature of a node and/or link per se and a network layer where the node and/or link is located, thus it is possible to determine network layers where part of nodes in the network are located by means of the correspondence, thereby reducing calculation amount required during calculation of a network layer to which each link subset is attributed and improving processing speed. Therefore, as a preferred implementation, before the step for determining a network layer, the embodiment may further include: network layers to which nodes and/or links in the network are attributed are labeled according to network feature information, wherein the network feature information is used to characterize relations between the nodes and/or links and the network layers.

In the step for determining a network layer, a network layer to which the link subset L(Vx)y is attributed can be determined through various ways depending on practical application conditions. For example, the network layer to which the link subset L(Vx)y is attributed can be determined according to predetermined information, wherein the predetermined information includes at least one of: proximity relations between a networked network corresponding to the link subset L(Vx)y and networked network corresponding to other link subsets, network feature information for characterizing relations between nodes and/or links and network layers, or labeling information of network layers to which the nodes and/or links are attributed.

The network feature information in the above implementation can be inherent to the network, it can also be defined by a user, and content included in the network feature information can be determined according to practical application scenarios of a networked network. For example, the network feature information can include at least one of: a correspondence between the type of a node and a network layer to which the node is attributed, a correspondence between the device model of the node and the network layer to which the node is attributed, or a correspondence between the rate of a link and a network layer to which the link and/or a node connected to the link is attributed.

The method for determining a network layer to which each link subset is attributed in a three-layer network scenario will be described through a preferred implementation. It should be noted that in practical applications other methods can be used to implement the determination of a network layer, for example, determining a network layer through determined labeling information in above embodiment. In the preferred embodiment, the step for determining a network layer may include:

in the case that the link subset L(Vx)y meets a first condition, it is determined that the network layer to which the link subset L(Vx)y is attributed is an access layer;

in the case that the link subset L(Vx)y meets a second condition, it is determined that the network layer to which the link subset L(Vx)y is attributed is an convergence layer;

in the case that the link subset L(Vx)y meets a third condition, it is determined that the network layer to which the link subset L(Vx)y is attributed is an core layer;

In an embodiment, wherein the first condition may include at least one of:

there is a link of the access layer in a first networked network corresponding to the link subset L(Vx)y; or there is a node of the access layer in the first networked network corresponding to the link subset L(Vx)y and all of links connected with the node have a same rate;

the second condition may include at least one of:

the first networked network corresponding to the link subset L(Vx)y is connected with a second networked network of the access layer, and the second networked network has a rate level higher than a rate level of the first networked network;

the first networked network corresponding to the link subset L(Vx)y is connected with multiple networked networks, a second networked network of a core layer and a third networked network of the access network exist simultaneously in the multiple networked networks, the rate level of the first networked network is larger than a rate level of the third networked network of the access layer and is smaller than or equal to a rate level of the second networked network of the core layer;

the first networked network corresponding to the link subset L(Vx)y is adjacent to the second networked network, the first networked network is connected with the third networked network of the access layer, the second networked network is connected with a fourth networked network of the access layer, and the rate level of the first networked network is larger than the rate level of the third networked network and the rate level of the second networked network is larger than a rate level of the fourth networked network;

the first networked network corresponding to the link subset L(Vx)y is adjacent to the second networked network, the first networked network is connected with the third networked network of the access layer, the second networked network is not connected with networked networks of any access layer, the rate level of the second networked network is larger than or equal to the rate level of the first networked network, and the rate level of the first networked network is larger than the rate level of the third networked network;

the third condition may include:

the first networked network corresponding to the link subset L(Vx)y is adjacent to the second networked network, the second networked network is connected with the third networked network of the access layer, the first networked network is not connected with networked networks of any access layer, the rate level of the first networked network is larger than or equal to the rate level of the second networked network, and the rate level of the second networked network is larger than the rate level of the third networked network.

The method for determining a network layer to which each link subset is attributed in a two-layer network scenario will be described through a preferred implementation. It should be noted that in practical applications other methods can be used to implement the determination of a network layer, for example, determining a network layer through determined labeling information in above embodiment. In the preferred embodiment, the step for determining a network layer may include:

in the case that the link subset L(Vx)y meets a first condition, it is determined that the network layer to which the link subset L(Vx)y is attributed is an access layer;

in the case that the link subset L(Vx)y meets a fourth condition, it is determined that the network layer to which the link subset L(Vx)y is attributed is an core convergence layer;

In an embodiment, wherein the first condition may include at least one of:

there is a link of the access layer in a first networked network corresponding to the link subset L(Vx)y; or there is a node of the access layer in the first networked network corresponding to the link subset L(Vx)y and all of links connected with the node have a same rate;

the fourth condition may include at least one of:

the first networked network corresponding to the link subset L(Vx)y is connected with a second networked network of the access layer, and the second networked network has a rate level higher than a rate level of the first networked network;

the first networked network corresponding to the link subset L(Vx)y is connected with multiple networked networks, a second networked network of a core layer and a third networked network of the access network exist simultaneously in the multiple networked networks, the rate level of the first networked network is larger than a rate level of the third networked network of the access layer and is smaller than or equal to a rate level of the second networked network of the core layer;

the first networked network corresponding to the link subset L(Vx)y is adjacent to the second networked network, the first networked network is connected with the third networked network of the access layer, the second networked network is connected with a fourth networked network of the access layer, and the rate level of the first networked network is larger than the rate level of the third networked network and the rate level of the second networked network is larger than a rate level of the fourth networked network;

the first networked network corresponding to the link subset L(Vx)y is adjacent to the second networked network, the first networked network is connected with the third networked network of the access layer, the second networked network is not connected with networked networks of any access layer, the rate level of the second networked network is larger than or equal to the rate level of the first networked network, and the rate level of the first networked network is larger than the rate level of the third networked network;

the first networked network corresponding to the link subset L(Vx)y is adjacent to the second networked network, the second networked network is connected with the third networked network of the access layer, the first networked network is not connected with networked networks of any access layer, the rate level of the first networked network is larger than or equal to the rate level of the second networked network, and the rate level of the second networked network is larger than the rate level of the third networked network.

It should be noted that in the case that a network layer of the a link subset determined through above way is not consistent with a labeled network layer of the link subset, the calculated result or the labeled result shall prevail preferentially according to system settings, certainly, both of the two results can be output to a user for his/her determination.

Embodiment 8

As a preferred implementation, after determination of one or more pieces of topology information of a network is performed according to embodiments 1 to 7, the present embodiment may further include: the topology information is outputted, wherein the topology information can include at least one of:

network layers to which respective link subsets L(Vx)y are attributed;

nodes included in respective link subsets L(Vx)y;

a number of the nodes included in respective link subsets L(Vx)y;

links included in respective link subsets L(Vx)y;

types of networked networks to which respective link subsets L(Vx)y are attributed;

rate levels corresponding to respective link subsets L(Vx)y;

ring forming ratios of respective network layers of the network;

nodes having no links connected therewith in the network; or a number of the nodes having no links connected therewith in the network.

The above information can be acquired directly or indirectly from results determined in above embodiments 1 to 7, thus detailed description thereof will be omitted herein.

It can be seen from above embodiments 1 to 8 that the above solution for determining topology of a network enables automatic calculation of a network layer to which a node is attributed, and then enables automatic calculation of a structure of a networked network of each network layer and a number of nodes of each network layer. The method is applied to analysis of topology of both a PTN network and other layered networks. A processing process of the method will be elaborated through specific embodiments.

Embodiment 9

When a PTN network is optimized, it is know that layers of the PTN network have their corresponding rate levels, some networks have three layers: an access layer, a convergence layer and a core layer, while some networks have two layers: an access layer and a core convergence layer. The relation of rate levels among different layers is access layer≤convergence layer≤core layer, or access layer≤core convergence layer. Links of a same networked network in a same network layer have a same network, for example for a convergence layer including 4 links, rates of the 4 links must be the same, if the rates of the links are different, the convergence layer can not be formed at all. Volume of an upper layer network should be larger than or equal to that of a lower layer network, and can not be smaller than that of the lower layer network, i.e., volume of a core layer network>=volume of a convergence layer network>volume of an access layer.

Topology of the PTN network can be represented by a non-directed graph G(N, L). The topology is determined according to a practical application, links between nodes are known and a number of layers of the network is known. Meanings of relevant parameters are explained firstly.

L represents a set of links of a whole network, and there may be multiple links between nodes;

L(Vx) represents a network link set having a rate level Vx;

L(Vx)y represents a link subset divided from the link set L(Vx) according to connectivities.

Figure 6:
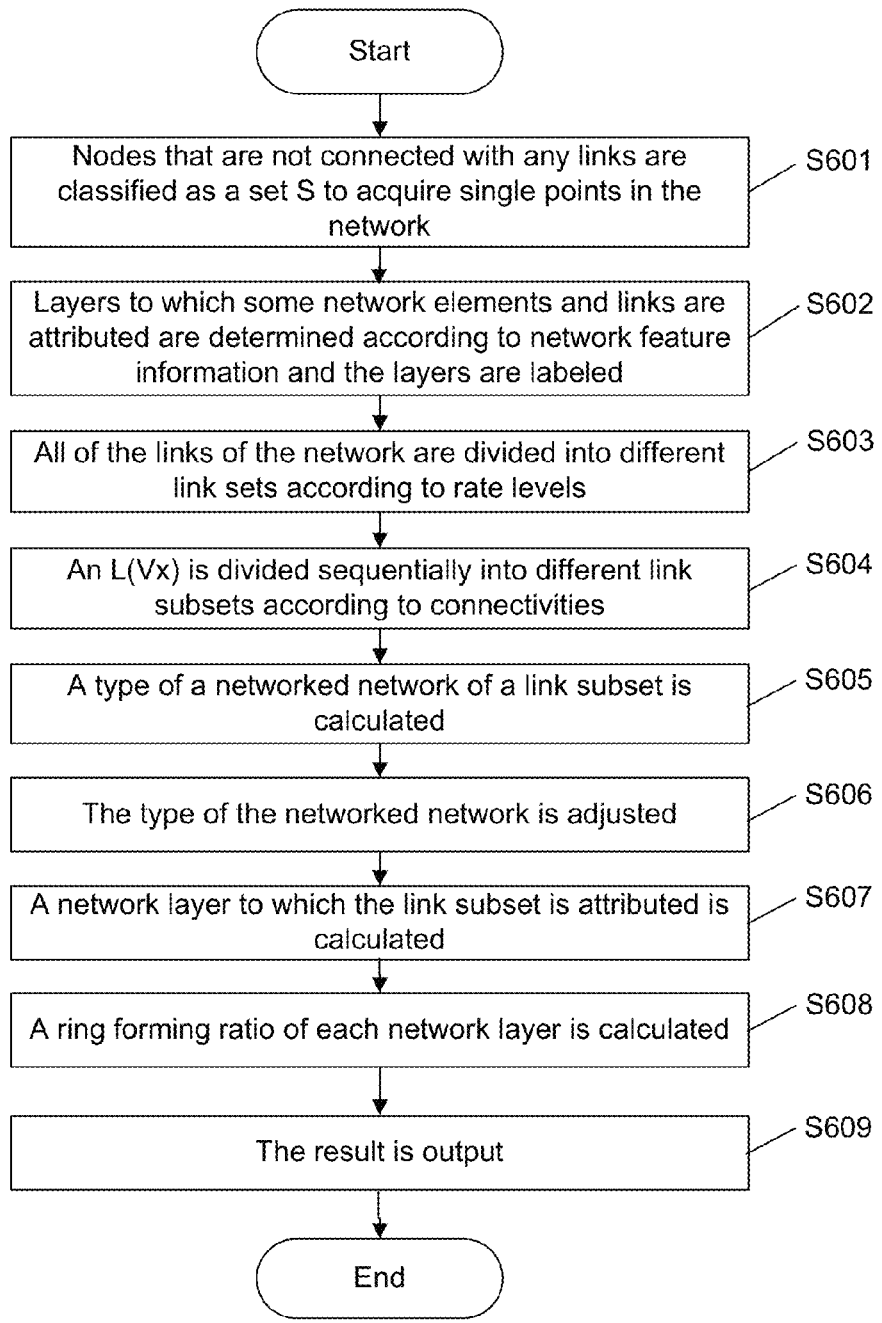
FIG. 6 is a detailed flowchart of a method for determining topology of a network according to a ninth embodiment of the disclosure.
Figure 7A:
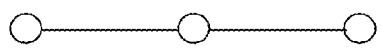
FIG. 7(a) is a schematic diagram of a chain network according to the ninth embodiment of the disclosure.
Figure 7B:
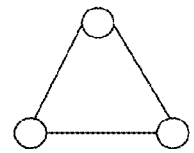
FIG. 7(b) is a schematic diagram of a ring network according to the ninth embodiment of the disclosure.
Figure 7C:
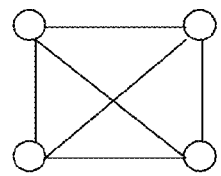
FIG. 7(c) is a schematic diagram of a mesh network according to the ninth embodiment of the disclosure.
Figure 7D:
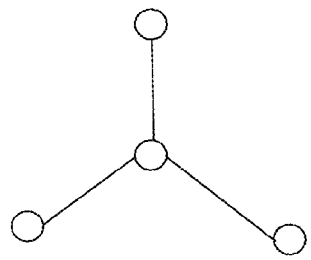
FIG. 7(d) is a schematic diagram of a star network according to the ninth embodiment of the disclosure.
Figure 7E:
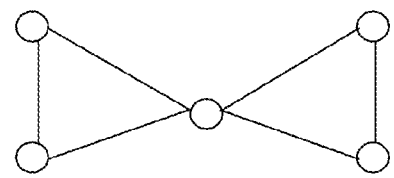
FIG. 7(e) is a schematic diagram of a tangent ring network according to the ninth embodiment of the disclosure.
Figure 7F:
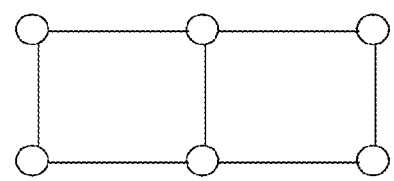
FIG. 7(f) is a schematic diagram of an intersecting ring network according to the ninth embodiment of the disclosure.

Based on this, the embodiment describes in detail a method for determining automatically topology of a network. FIG. 6 is a detailed flowchart of a method for determining topology of a network according to embodiment 9 of the disclosure, as shown in FIG. 6, the method includes:

step S601, nodes that are not connected with any links are classified as a set S, each node in the set S is a networked network, a type of the networked network is single-point network, which is not involved in a separate calculation of network layers. Preferably, a number of the nodes in the set S can be counted so as to provide subsequent output of network topology with basic data.

Step S602, layers to which some network elements and links are attributed are determined according to network element types of nodes, link rates and basic information input by a user. Such a relation between information of the network element and of the link and the network layer is referred to as network feature information below.

There are multiple types of network feature information, for example:

a) a network layer to which a node is attributed can be deducted in advance from a device model (for example, when a PTN network boundary uses a ZTE device, the network layer to which a device with its model ZX61XX is attributed can be determined as an access layer, and for other device manufacturers, the same applies);

b) when in a network, a link rate is determined to be unique to a network layer, then the network layer of the link can be determined;

c) when a highest rate link connected to a node is a link whose rate is unique to a network layer, then the node is attributed to the network layer;

d) a user is enabled to determine which device models or link rates are respectively attributed to which network layers so as to comply with special conditions with respect to network structure in certain occasions and to save calculation time of programs.

Step 603, all of the links L of the network are divided into different link sets L(V1), . . . , L(Vn) according to rate levels.

Step S604, an L(Vx) is divided sequentially into different link subsets L(Vx)1 . . . L(Vx)k according to connectivities, wherein 1≤x≤n. In this step, link subsets obtained based on connectivities are such link subsets, respective nodes in each of which are connected with each other links in the subset and none of nodes in the subset have links with other subsets.

Step S605, a type of a networked network of L(Vx)y is calculated using network feature information, wherein 1≤y≤k. FIG. 7 are schematic diagrams of types of networked networks according to embodiment 1, wherein circles represent nodes and lines represent links; as shown in FIG. 7, in step S605, the types of networked networks include a chain network (FIG. 7(a)), a ring network (FIG. 7(b)), a mesh network (FIG. 7(c)), a star network (FIG. 7(d)), a tangent ring network (FIG. 7(e)), an intersecting ring network (FIG. 7(f)) and the like. The type of a networked network is calculated as follows.

For a networked network, it must be interconnected and attributed to one network layer. If a number of nodes connected to one node is referred to as a degree of the node, which is abbreviated as d, and a number of nodes of one networked network is abbreviated as p. Then the type of the networked network is calculated as follows (following steps can be performed in sequence, when it is determined that a networking condition is complied with, then the process is ended and a result is returned).

Step 1, when a networked network has its P≥2, wherein two of the P nodes have their degrees d=1 and other nodes have their degrees d=2, then the type of the networked network is a chain network;

Step 2, when a networked network has its P≥3, wherein each of the P nodes has its degree d=2, then the type of the networked network is a ring network;

Step 3, when a networked network has its P≥4, wherein N of the P nodes have their degrees d=1, one of the P nodes has its degree d=N and other nodes have their degrees d=2, then the type of the networked network is a star network;

Step 4, when a networked network has its P≥5, wherein one of the P nodes has its degree d=4 and other nodes have their degrees d=2, then the type of the networked network is a tangent ring network;

Step 5, when a networked network has its P≥6, wherein two of the P nodes have their degrees d=3 and other nodes have their degrees d=2, then the type of the networked network is an intersecting ring network; and Step 6, when a networked network has its P≥4, wherein each of the P nodes has its degree d=3, then the type of the networked network is a mesh network.

Step S606, the type of the networked network of L(Vx)y is re-calculated according to relations between L(Vx)y and other networked networks, wherein 1≤y≤k. In this step, two end nodes of a chain networked network (or star networked network) of a lower layer are two nodes of a networked network of an upper layer, then the chain networked network (or two branches of the star networked network) is adjusted to a ring networked network, and in the mean time nodes and links between the two nodes of the upper layer are added.

Step S607, a network layer to which L(Vx)y is attributed is calculated according to proximity relations between L(Vx)y and other networked networks, wherein 1≤y≤k. A method for determining a network layer to which a networked network is attributed is as follows.

a) firstly a networked network of an access layer is determined, i.e., when a networked network has links of the access layer included therein or a network has a node of the access layer included therein and links connected with the node have a same rate, then the networked network is a networked network of the access layer;

b) a networked network X is connected with a networked network Y, when the networked network Y is a networked network of the access layer and the networked network X has a rate level higher than that of the networked network Y, then the networked network X is a networked network of a convergence layer;

c) a networked network X has multiple networked networks Y1 ... Yn connected therewith, when in Y1 ... Yn there are simultaneously a networked network Yi of a core layer and a networked network of the access layer and X has a rate level higher than that of Yj but smaller than or equal to that of Yi, then a network layer to which X is attributed is a convergence layer;

d) a networked network X is adjacent to (intersects with or is tangent to) a networked network Y, when the networked network X is connected with a networked network M attributed to an access layer, the networked network Y is connected with a networked network N attributed to the access layer, and X has a rate level higher than that of M and Y has a rate level higher than that of N, then both X and Y are attributed to a convergence layer;

e) a networked network X is connected with a networked network Y, when the networked network Y is connected with a networked network Z attributed to an access layer, the networked network X is not connected to any networked network attributed to the access layer, and the networked network X has a rate level higher than or equal to that of the networked network Y and the networked network Y has a rate level higher than that of the networked network Z, then the networked network X is a core networked network and the networked network Y is a networked network attributed to convergence layer;

Some simple networks have no networks attributed to a core layer, then above convergence layer can be replaced by a core convergence layer, the relevant determination method remains unchanged.

Step S608, a ring forming ratio of each network layer is calculated. Specifically, the ring forming ratio is defined as below: when a node of the network belongs to one of any types of ring networks (ring, intersecting ring, tangent ring) or mesh networks, then the node is referred to as a ring forming node, otherwise the node is referred to as a non-ring forming node, thus a ratio between a number of ring forming nodes in a network layer and a number of nodes in the network layer is referred to as the ring forming ratio of the network layer.

The ring forming ratio of a network layer can be calculated as below: after distinguishing types of networked networks through methods in the above embodiments, re-determining the types of the networked networks (optional, not performed in cases when there are no types of networked networks to be re-determined) and calculating a network layer, it is determined whether each node in the network layer is one of a ring network, an intersecting ring network, a tangent ring network or a mesh network, if yes, the node is involved in the counting, and a ratio between a final counting result and the number of nodes in the network layer is namely the ring forming ratio of the network layer.

Step S609, the result is output.

Embodiment 10

Figure 8:
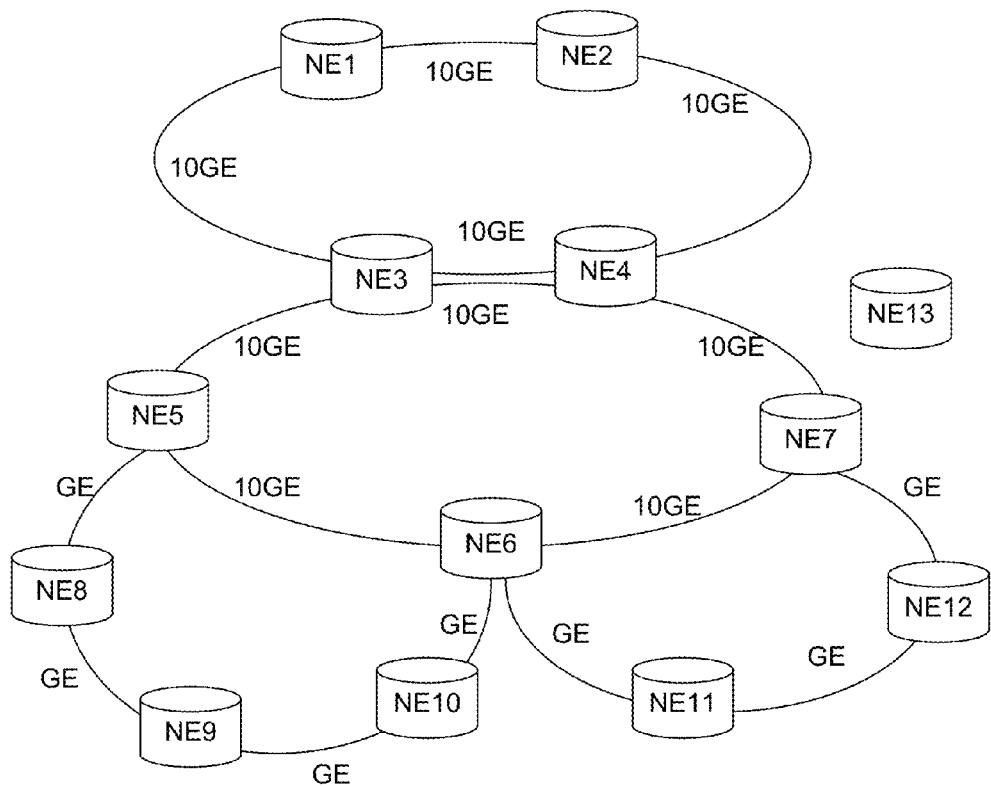
FIG. 8 is a topology diagram of a PTN network according to a tenth embodiment of the disclosure.

FIG. 8 is a topology diagram of a PTN network according to embodiment 10 of the disclosure; In this embodiment, a topology of a specific PTN network is taken as an example, a method for automatically calculating a structure of a networked network attributed to each network layer in a PTN network is described in detail with reference to FIG. 8, and the method includes:

step 1, default network feature information and user input are given, these two pieces of information contain contents having forms consistent with each other, with both being used to describe network layers to which certain types of nodes are attributed and/or network layers to which links having a certain rate are attributed. (This step is optional, but it is introduced to be adapted to special type of network and to reduce time taken by calculation).

Step 2, according to the information given in the above step, a topology graph of a whole network is labeled: a) for example, NE8, NE9, NE10 are all devices of a ZX61XX series, and it can be known from the default information that such type of devices can only serve as devices attributed to an access layer, then network elements, i.e., the nodes NE8, NE9, NE10 are labeled as nodes attributed to the access layer; b) when the user input information says "a GE rate is a rate of the access layer", then NE8, NE9, NE10, NE11, NE12 are all taken as network elements attributed to the access layer, because links connected with them has a maximum rage of GE.

Step, links sets in FIG. 8 are divided into two links sets L(10GE) and L(GE) according to respective rate levels.

Step 4, link sets are divided according to connectivities as follows.

The link set L(10GE) is further divided, according to connectivities, into a link group L(10GE) 1 (because all nodes in the link group can be achievable through links therebetween) including links NE1<->NE3, NE3<->NE4, NE4<->NE2, NE2<->NE1, NE3<->NE5, NE5<->NE6, NE6<->NE7, NE7<->NE4.

The link set L(10GE) is further divided, according to connectivities, into different link groups L(GE) 1 and L(GE) 2, wherein L(GE)1 includes links NE5<->NE8, NE8<->NE9, NE9<->NE10, NE10<->NE6, and L(GE)2 includes links NE6<->NE11, NE11<->NE12, NE12<->NE7. It should be noted that NE6 has two rates GE and 10GE, thus it is a boundary network element having a rate of an upper layer, the connectivity of a rate of a lower layer is ended at the boundary network element having a rate of an upper layer, therefore links NE6<->NE10 and NE6<->NE11 are attributed to two different link groups.

Step 5, a type of a networked network of each link subset is calculated as follows.

The type of a networked network of L(10GE)1 is calculated, and the result shows that it is an intersecting ring network which is divided into two ring networks RING 1 and RING 2, wherein RING 1 consists of NE1<->NE3<->NE4<->NE2<->NE1, and RING 2 consists of NE3<->NE5<->NE6<->NE7<->NE4.

The type of a networked network of L(GE)1 is calculated, and the result shows that it is a chain network LINK 1 consisting of NE5<->NE8<->NE9<->NE10<->NE6.

The type of a networked network of L(GE)2 is calculated, and the result shows that it is a chain network LINK 2 consisting of NE6<->NE11<->NE12<->NE7.

Step 6, a type of a networked network of each link subset is adjusted as follows.

Both end points A and Z of the LINK 1 are on the RING 2, it indicates that the LINK 1 is actually a ring network, then the type of a networked network of LINK 1 is adjusted to a ring network RING 3 consisting of NE5<->NE8<->NE9<->NE10<->NE6<->NE5.

Both end points A and Z of the LINK 2 are on the RING 2, it indicates that the LINK 1 is actually a ring network, then the type of a networked network of LINK 2 is adjusted to a ring network RING 4 consisting of NE6<->NE11<->NE12<->NE7<->NE6.

Step 7, a network layer to which each link subset is attributed is determined;

According to correspondences between respective network layers and rate levels (core layer: 10GE; convergence layer: 10GE; access layer: GE), it can be identified that network layers to which the RING 3 and RING 4 are attributed are an access layer.

The RING 2 is only adjacent to the RING 3 and RING4, and the RING 2 has a rate level higher than those of RING 3 and RING 4, so it can be identified that the network layer to which the RING 2 is attributed is a convergence layer.

The RING 1 is only adjacent to the RING 2, and the RING 1 has a rate level higher than that of RING 2 and the RING 1 is not adjacent to any networked network of an access layer, so it can be identified that the network layer to which the RING 2 is attributed is a core layer.

Step 8, the result is output. as shown in below Table 1.

artificially all links (and then nodes of respective links) to various network layers of respective layered networks when the networks have relatively large scale, it enables automatic calculation of a network layer to which a node is attributed, then enables automatic calculation of a, thereby providing basic data to subsequent topology optimization of the network.

Embodiment 12

Figure 10:
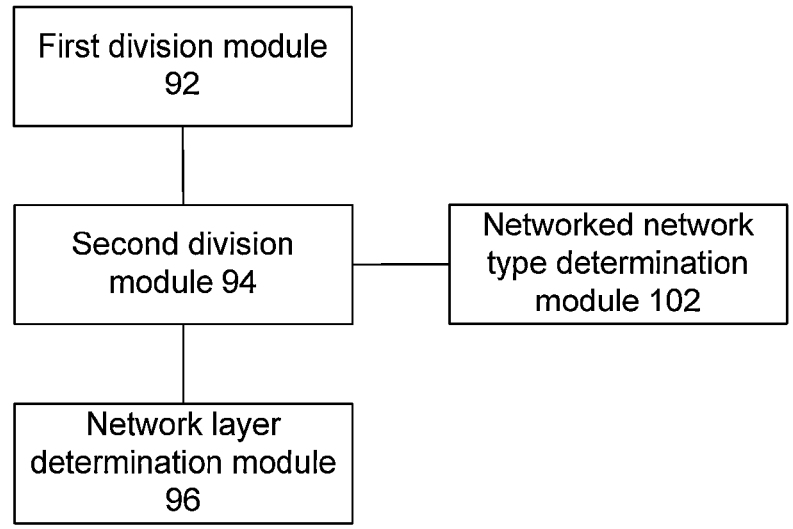
FIG. 10 is a structural diagram of a device for determining topology of a network according to a twelfth embodiment of the disclosure.

FIG. 10 is a structural diagram of a device for determining topology of a network according to embodiment 12 of the disclosure, as shown in FIG. 10, on a basis of embodiment 11, the device may further include:

a networked network type determination module 102, coupled to the second division module 94, configured to determine a type of a networked network to which the link subset L(Vx)y is attributed.

TABLE 1

Calculated results output of the topology of a PTN network according to embodiment 10

| Networked network Name | Attributed network layer | Type of networked network | Rate level | Network elements passed through | Number of nodes |
|---|---|---|---|---|---|
| Single points in whole network | None | Single point | None | NE13 | 1 |
| Core layer 10G Ring 1 | Core layer | Ring | 10GE | NE1<->NE2<->NE3<->NE4<->NE1 | 4 |
| Convergence layer 10G Ring 1 | Convergence layer | Ring | 10GE | NE3<->NE4<->NE5<->NE6<->NE7<->NE3 | 5 |
| Access layer GE Ring 1 | Access layer | Ring | GE | NE5<->NE6<->NE8<->NE9<->NE10<->NE5 | 5 |
| Access layer GE Ring 2 | Access layer | Ring | GE | NE6<->NE7<->NE11<->NE12<->NE6 | 4 |

According to the topology of the PTN network, networking conditions of respective network layers are automatically analyzed, so it is possible to output types of networked networks included in respective network layers, thus providing basic data to subsequent network optimization. The method is also applied to layered networks such as MSTP, thus extending applicability of the method.

Embodiment 11

Figure 9:
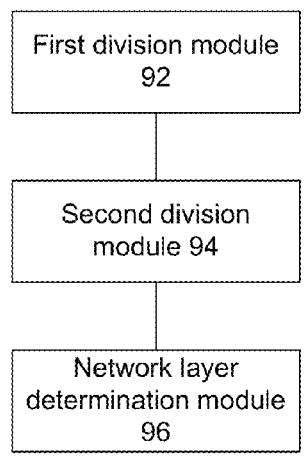
FIG. 9 is a structural diagram of a device for determining topology of a network according to a eleventh embodiment of the disclosure.

FIG. 9 is a structural diagram of a device for determining topology of a network according to embodiment 11 of the disclosure, as shown in FIG. 9, the device includes:

a first division module 92 configured to divide, according to rate levels V1, . . . , Vn of links of the network, all of the links of the network into link sets L(V1), . . . , L(Vn), wherein n is a positive integer equal to or larger than 1;

a second division module 94, coupled to the first division module 92, configured to divide, according to connectivities of the links, a link set L(Vx) into link subsets L(Vx)1, . . . , L(Vx)k, wherein 1≤x≤n and k is a positive integer equal to or larger than 1; and a network layer determination module 96, coupled to the second division module, configured to determine a network layer to which a link subset L(Vx)y is attributed, wherein 1≤y≤k.

Through this device, all links are divided into link sets according to rates, then the link sets are divided into link subsets according to connectivities, thus respective links are divided automatically into different sets/subsets, which facilitates attribution of respective links to different network layers; it solves the problem that it is difficult to divide By means of the device, based on the acquisition of the network layer, a type of a networked network for each network layer can also be acquired, which can be provided as basic data for subsequent topology optimization of the network.

Embodiment 13

Figure 11:
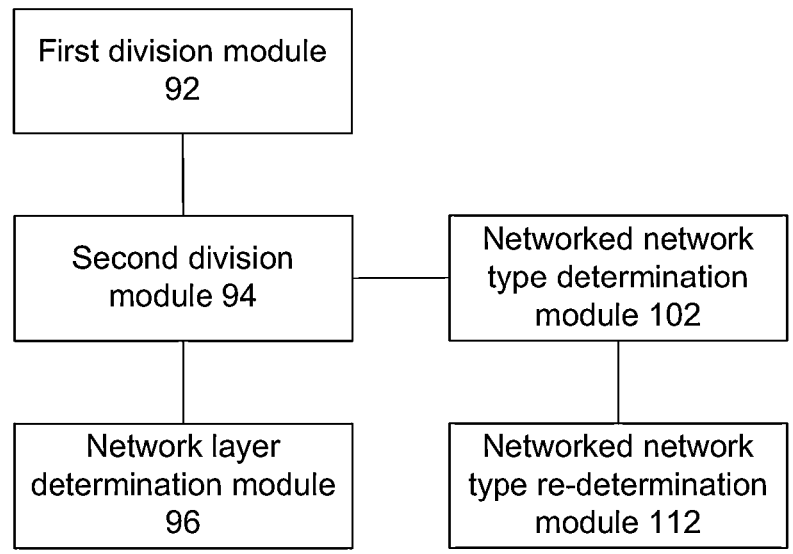
FIG. 11 is a structural diagram of a device for determining topology of a network according to a thirteenth embodiment of the disclosure.

FIG. 11 is a structural diagram of a device for determining topology of a network according to a eleventh embodiment of the disclosure, as shown in FIG. 11, on the basis of embodiment 12, the device may further include:

a networked network re-determination module 112, coupled to the networked network type determination module 102, configured to re-determine, according to a relation between the networked network corresponding to the link subset L(Vx)y and networked networks corresponding to other link subsets, the type of the networked network to which the link subset L(Vx)y is attributed.

Embodiment 14

Figure 12:
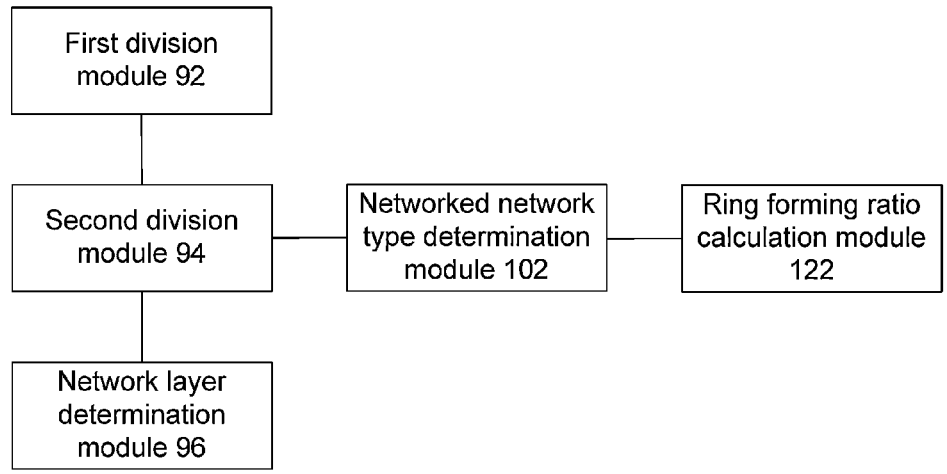
FIG. 12 is a structural diagram of a device for determining topology of a network according to a fourteenth embodiment of the disclosure.

FIG. 12 is a structural diagram of a device for determining topology of a network according to embodiment 14 of the disclosure, as shown in FIG. 12, on a basis of embodiment 12, the device may further include:

a ring forming ratio calculation module 122, coupled to the networked network type determination module 102, configured to calculate a ring forming ratio of each network layer of the network, wherein the ring forming ratio of each network layer is a ratio between a number of nodes forming a ring in each network layer and a number of all nodes in said each network layer, the nodes forming a ring are nodes on a predetermined type of networked network, and the predetermined type of networked network comprises one of: a mesh network, a ring network, an intersecting ring network or a tangent ring network.

Embodiment 15

Figure 13:
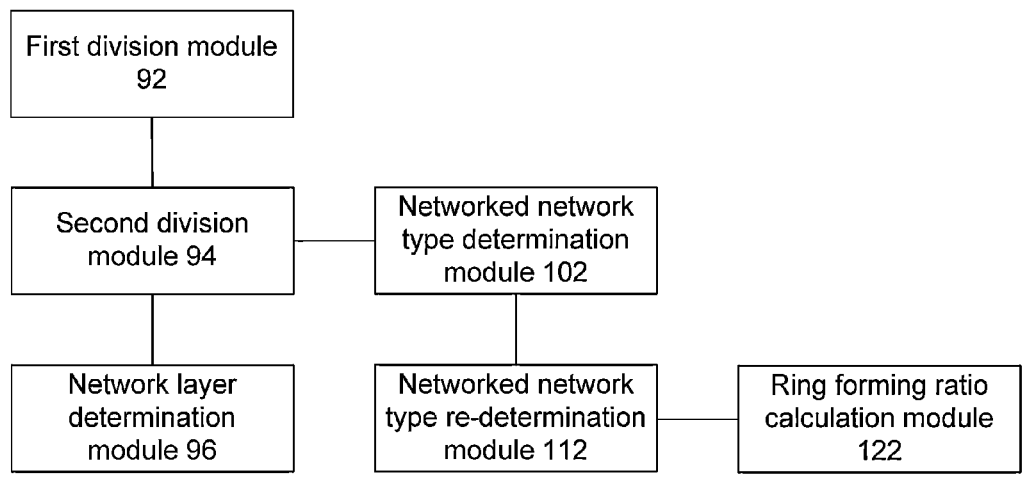
FIG. 13 is a structural diagram of a device for determining topology of a network according to a fifteenth embodiment of the disclosure.

FIG. 13 is a structural diagram of a device for determining topology of a network according to embodiment 15 of the disclosure, as shown in FIG. 13, on a basis of embodiment 13, the device may further include:

a ring forming ratio calculation module 122, coupled to the networked network type re-determination module 112, configured to calculate a ring forming ratio of each network layer of the network, wherein the ring forming ratio of each network layer is a ratio between a number of nodes forming a ring in each network layer and a number of all nodes in said each network layer, the nodes forming a ring are nodes on a predetermined type of networked network, and the predetermined type of networked network comprises one of: a mesh network, a ring network, an intersecting ring network or a tangent ring network.

Above device for determining topology of a network is used to implement aforementioned method for determining topology of a network, its specific implementation can be achieved with reference to corresponding description of the method for determining topology of a network, and the detailed description thereof will be omitted herein.

From above description, it can be learned that the disclosure achieves the following technical effects:

all links are divided into link sets according to rates, then the link sets are divided into link subsets according to connectivities, thus respective links are divided automatically into different sets/subsets, which facilitates attribution of respective links to different network layers; the disclosure solves the problem that it is difficult to divide artificially all links (and then nodes of respective links) to various network layers of respective layered networks when the networks have relatively large scale, it enables automatic calculation of a network layer to which a node is attributed, then enables automatic calculation of a networking structure of each layer of network and a number of nodes therein, and further enables automatic determination of topology of a current network, thereby providing basic data to subsequent topology optimization of the network.

Apparently, it should be appreciated by those skilled in the art that various modules and steps of above embodiments of the disclosure can be implemented by a general-purpose computing device, and they may be integrated into an individual computing device or distributed on a network consisting of multiple computing devices; optionally, they can be implemented by program codes executable by a computing device so that they can be stored in a storage device so as to be implemented by a computing device, and in some cases, steps shown and described may be implemented in an order different from what described herein, or they can be implemented by being made as respective IC modules or by some modules or steps therein being made as individual IC modules. In this way, the embodiments of the disclosure are not limited to any specific combinations of a hardware and a software.

What described are merely preferable embodiments of the disclosure and are not intended to limit the disclosure, and numerous modifications and variations will be apparent to those skilled in the art. All modifications, replacements and improvements made within the spirit and principles of the disclosure should be included within the scope of protection of the disclosure.

The invention claimed is:

1. A method for determining topology of a network, comprising:

dividing, according to rate levels V1, . . . , Vn of links of the network, all of the links of the network into link sets L(V1), . . . , L(Vn), wherein n is a positive integer equal to or larger than 1;

dividing, according to connectivities of the links, a link set L(Vx) into link subsets L(Vx)1, . . . , L(Vx)k, wherein 1≤x≤n and k is a positive integer equal to or larger than 1; and determining a network layer to which a link subset L(Vx)y is attributed, wherein y is a positive integer and 1≤y≤k;

wherein after the dividing, according to connectivities of the links, a link set L(Vx) into link subsets L(Vx)1, . . . , L(Vx)k, the method further comprises:

determining a type of a networked network to which the link subset L(Vx)y is attributed; and wherein after the determining a network layer to which a link subset L(Vx)y is attributed and the determining a type of a networked network to which the link subset L(Vx)y is attributed, the method further comprises:

calculating a ring forming ratio of each network layer of the network, wherein the ring forming ratio of each network layer is a ratio between a number of nodes forming a ring in each network layer and a number of all nodes in said each network layer, the nodes forming a ring are nodes on a predetermined type of networked network, and the predetermined type of networked network comprises one of: a mesh network, a ring network, an intersecting ring network or a tangent ring network;

wherein when a networked network corresponding to the link subset L(Vx)y includes P nodes, and a number of nodes connected with a node is designated as a degree d of the node, then the determining a type of a networked network to which the link subset L(Vx)y is attributed comprises:

when P≥2, two nodes in the networked network have their degrees d=1 and other nodes have their degrees d=2, then the type of the networked network to which the link subset L(Vx)y is attributed is a chain network;

when P≥3 and each node in the networked network has its degree d=2, then the type of the networked network to which the link subset L(Vx)y is attributed is a ring network;

when P≥4, N nodes in the networked network have their degrees d=1, one node has its degree d=N and other nodes have their degrees d=2, then the tyre of the networked network to which the link subset L(Vx)y is attributed is a star network;

when P≥5, one node in the networked network has its degree d=4 and other nodes have their degrees d=2, then the type of the networked network to which the link subset L(Vx)y is attributed is a tangent ring network;

when P≥6, two nodes in the networked network have their degrees d=3 and other nodes have their degrees d=2, then the type of the networked network to which the link subset L(Vx)y is attributed is an intersecting ring network;

when P≥4 and each node in the networked network has its degree d≥3, then the type of the networked network to which the link subset L(Vx)y is attributed is a mesh network.

2. The method according to claim 1, after the determining a type of a networked network to which the link subset L(Vx)y is attributed, further comprising:
re-determining, according to a relation between the networked network corresponding to the link subset L(Vx)y and networked networks corresponding to other link subsets, the type of the networked network to which the link subset L(Vx)y is attributed.

3. The method according to claim 2, wherein the re-determining, according to a relation between the networked network corresponding to the link subset L(Vx)y and networked networks corresponding to other link subsets, the type of the networked network to which the link subset L(Vx)y is attributed comprises:
in the case that the type of the networked network to which the link subset L(Vx)y is attributed is a chain network, when two end nodes of the networked network corresponding to the link subset L(Vx)y are two nodes in an upper-layer networked network, then adjusting the type of the networked network to which the link subset L(Vx)y is attributed to a ring network, and adding nodes and links between the two nodes in the upper-layer networked network to the networked network corresponding to the link subset L(Vx)y; or
in the case that the type of the networked network to which the link subset L(Vx)y is attributed is a star network, when two end nodes of the networked network corresponding to the link subset L(Vx)y are two nodes in an upper-layer networked network, then adjusting two branches of the star network in the networked network to which the link subset L(Vx)y is attributed to a ring network, and adding nodes and links between the two nodes in the upper-layer networked network to the networked network corresponding to the link subset L(Vx)y.

4. The method according to claim 1, before the determining a network layer to which the link subset L(Vx)y is attributed, further comprising:
labeling, according to network feature information, network layers to which nodes and/or links in the network are attributed, wherein the network feature information is used to characterize relations between the nodes and/or links and the network layers.

5. The method according to claim 4, wherein the network feature information comprises at least one of: a correspondence between the type of a node and a network layer to which the node is attributed, a correspondence between the device model of the node and the network layer to which the node is attributed, or a correspondence between the rate of a link and a network layer to which the link and/or a node connected to the link is attributed.

6. The method according to claim 1, wherein the determining a network layer to which the link subset L(Vx)y is attributed comprises:
determining, according to predetermined information, the network layer to which the link subset L(Vx)y is attributed, wherein the predetermined information comprises at least one of: proximity relations between a networked network corresponding to the link subset L(Vx)y and networked network corresponding to other link subsets, network feature information for characterizing relations between nodes and/or links and network layers, or labeling information of network layers to which the nodes and/or links are attributed.

7. The method according to claim 1, wherein the determining a network layer to which the link subset L(Vx)y is attributed comprises:
in the case that the link subset L(Vx)y meets a first condition, determining that the network layer to which the link subset L(Vx)y is attributed is an access layer;
wherein the first condition comprises at least one of:
there is a link of the access layer in a first networked network corresponding to the link subset L(Vx)y; or
there is a node of the access layer in the first networked network corresponding to the link subset L(Vx)y and all of links connected with the node have a same rate.

8. The method according to claim 1, wherein the determining a network layer to which the link subset L(Vx)y is attributed comprises:
in the case that the link subset L(Vx)y meets a condition, determining that the network layer to which the link subset L(Vx)y is attributed is an convergence layer;
wherein the condition comprises at least one of:
the first networked network corresponding to the link subset L(Vx)y is connected with a second networked network of an access layer, and the second networked network has a rate level higher than a rate level of the first networked network;
the first networked network corresponding to the link subset L(Vx)y is connected with multiple networked networks, a second networked network of a core layer and a third networked network of the access network exist simultaneously in the multiple networked networks, the rate level of the first networked network is larger than a rate level of the third networked network of the access layer and is smaller than or equal to a rate level of the second networked network of the core layer;
the first networked network corresponding to the link subset L(Vx)y is adjacent to the second networked network, the first networked network is connected with the third networked network of the access layer, the second networked network is connected with a fourth networked network of the access layer, and the rate level of the first networked network is larger than the rate level of the third networked network and the rate level of the second networked network is larger than a rate level of the fourth networked network; or
the first networked network corresponding to the link subset L(Vx)y is adjacent to the second networked network, the first networked network is connected with the third networked network of the access layer, the second networked network is not connected with networked networks of any access layer, the rate level of the second networked network is larger than or equal to the rate level of the first networked network, and the rate level of the first networked network is larger than the rate level of the third networked network.

9. The method according to claim 1, wherein the determining a network layer to which the link subset L(Vx)y is attributed comprises:
in the case that the link subset L(Vx)y meets a condition, determining that the network layer to which the link subset L(Vx)y is attributed is an core layer;
wherein the condition comprises:
the first networked network corresponding to the link subset L(Vx)y is adjacent to the second networked network, the second networked network is connected with a third networked network of an access layer, the first networked network is not connected with networked networks of any access layer, the rate level of the first networked network is larger than or equal to the rate level of the second networked network, and the rate level of the second networked network is larger than the rate level of the third networked network.

10. The method according to claim 1, wherein the determining a network layer to which the link subset L(Vx)y is attributed comprises:
in the case that the link subset L(Vx)y meets a condition, determining that the network layer to which the link subset L(Vx)y is attributed is an core convergence layer;
wherein the condition comprises at least one of:
the first networked network corresponding to the link subset L(Vx)y is connected with a second networked network of an access layer, and the second networked network has a rate level higher than a rate level of the first networked network;
the first networked network corresponding to the link subset L(Vx)y is connected with multiple networked networks, a second networked network of a core layer and a third networked network of the access network exist simultaneously in the multiple networked networks, the rate level of the first networked network is larger than a rate level of the third networked network of the access layer and is smaller than or equal to a rate level of the second networked network of the core layer;
the first networked network corresponding to the link subset L(Vx)y is adjacent to the second networked network, the first networked network is connected with the third networked network of the access layer, the second networked network is connected with a fourth networked network of the access layer, and the rate level of the first networked network is larger than the rate level of the third networked network and the rate level of the second networked network is larger than a rate level of the fourth networked network;
the first networked network corresponding to the link subset L(Vx)y is adjacent to the second networked network, the first networked network is connected with the third networked network of the access layer, the second networked network is not connected with networked networks of any access layer, the rate level of the second networked network is larger than or equal to the rate level of the first networked network, and the rate level of the first networked network is larger than the rate level of the third networked network; or
the first networked network corresponding to the link subset L(Vx)y is adjacent to the second networked network, the second networked network is connected with the third networked network of the access layer, the first networked network is not connected with networked networks of any access layer, the rate level of the first networked network is larger than or equal to the rate level of the second networked network, and the rate level of the second networked network is larger than the rate level of the third networked network.

11. The method according to claim 1, the dividing, according to connectivities of the links, a link set L(Vx) into link subsets L(Vx)1, . . . , L(Vx)k comprises:
dividing, based on a division rule with respect to connectivities, the link set L(Vx) into the link subsets L(Vx)1 . . . L(Vx)k, wherein the division rule with respect to connectivities comprises: respective nodes in each divided link subset can be connected with each other via links of the link subset and none of the nodes in the link subset has a link with other link subset.

12. The method according to claim 1, wherein during the dividing the link set L(Vx), according to connectivities, into link subsets L(Vx)1 . . . L(Vx)k, when one node corresponds simultaneously to a first rate level and a second rate level, then the link set L(Vx) is divided into two link subsets by taking the node as a boundary.

13. The method according to claim 1, further comprising:
outputting topology information, wherein the topology information comprises at least one of: network layers to which respective link subsets L(Vx)y are attributed, nodes included in respective link subsets L(Vx)y, a number of the nodes included in respective link subsets L(Vx)y, links included in respective link subsets L(Vx)y, types of networked networks to which respective link subsets L(Vx)y are attributed, rate levels corresponding to respective link subsets L(Vx)y, ring forming ratios of respective network layers of the network, nodes having no links connected therewith in the network, or a number of the nodes having no links connected therewith in the network.

14. A device for determining topology of a network, comprising:
one or more hardware processors; and
a plurality of program modules stored in a non-transitory computer-readable medium, when, executed by the one or more hardware processors, cause the device to perform predefined functions, the plurality of program modules further comprising:
a first division module configured to divide, according to rate levels V1, . . . , Vn of links of the network, all of the links of the network into link sets L(V1), . . . , L(Vn), wherein n is a positive integer equal to or larger than 1;
a second division module configured to divide, according to connectivities of the links, a link set L(Vx) into link subsets L(Vx)1, . . . , L(Vx)k, wherein 1≤x≤n and k is a positive integer equal to or larger than 1;
a network layer determination module configured to determine a network layer to which a link subset L(Vx)y is attributed, wherein y is a positive integer and 1≤y≤k;
a networked network type determination module configured to determine a type of a networked network to which the link subset L(Vx)y is attributed; and
a ring forming ratio calculation module configured to calculate a ring forming ratio of each network layer of the network, wherein the ring forming ratio of each network layer is a ratio between a number of nodes forming a ring in each network layer and a number of all nodes in said each network layer, the nodes forming a ring are nodes on a predetermined type of networked network, and the predetermined type of networked network comprises one of: a mesh network, a ring network, an intersecting ring network or a tangent ring network;
wherein when a networked network corresponding to the link subset L(Vx)y includes P nodes, and a number of nodes connected with a node is designated as a degree d of the node, then the determining a type of a networked network to which the link subset L(Vx)y is attributed comprises:
when P≥2, two nodes in the networked network have their degrees d=1 and other nodes have their degrees d=2, then the type of the networked network to which the link subset L(Vx)y is attributed is a chain network;

when P≥3 and each node in the networked network has its degree d=2, then the type of the networked network to which the link subset L(Vx)y is attributed is a ring network;

when P≥4, N nodes in the networked network have their degrees d=1, one node has its degree d=N and other nodes have their degrees d=2, then the tyre of the networked network to which the link subset L(Vx)y is attributed is a star network;

when P≥5, one node in the networked network has its degree d=4 and other nodes have their degrees d=2, then the type of the networked network to which the link subset L(Vx)y is attributed is a tangent ring network;

when P≥6, two nodes in the networked network have their degrees d=3 and other nodes have their degrees d=2, then the type of the networked network to which the link subset L(Vx)y is attributed is an intersecting ring network;

when P≥4 and each node in the networked network has its degree d≥3, then the type of the networked network to which the link subset L(Vx)y is attributed is a mesh network.

15. The device according to claim 14, wherein the plurality of program modules further comprises:
a networked network re-determination module configured to re-determine, according to a relation between the networked network corresponding to the link subset L(Vx)y and networked networks corresponding to other link subsets, the type of the networked network to which the link subset L(Vx)y is attributed.

* * * * *